United States Patent Office 3,363,218
Patented Jan. 9, 1968

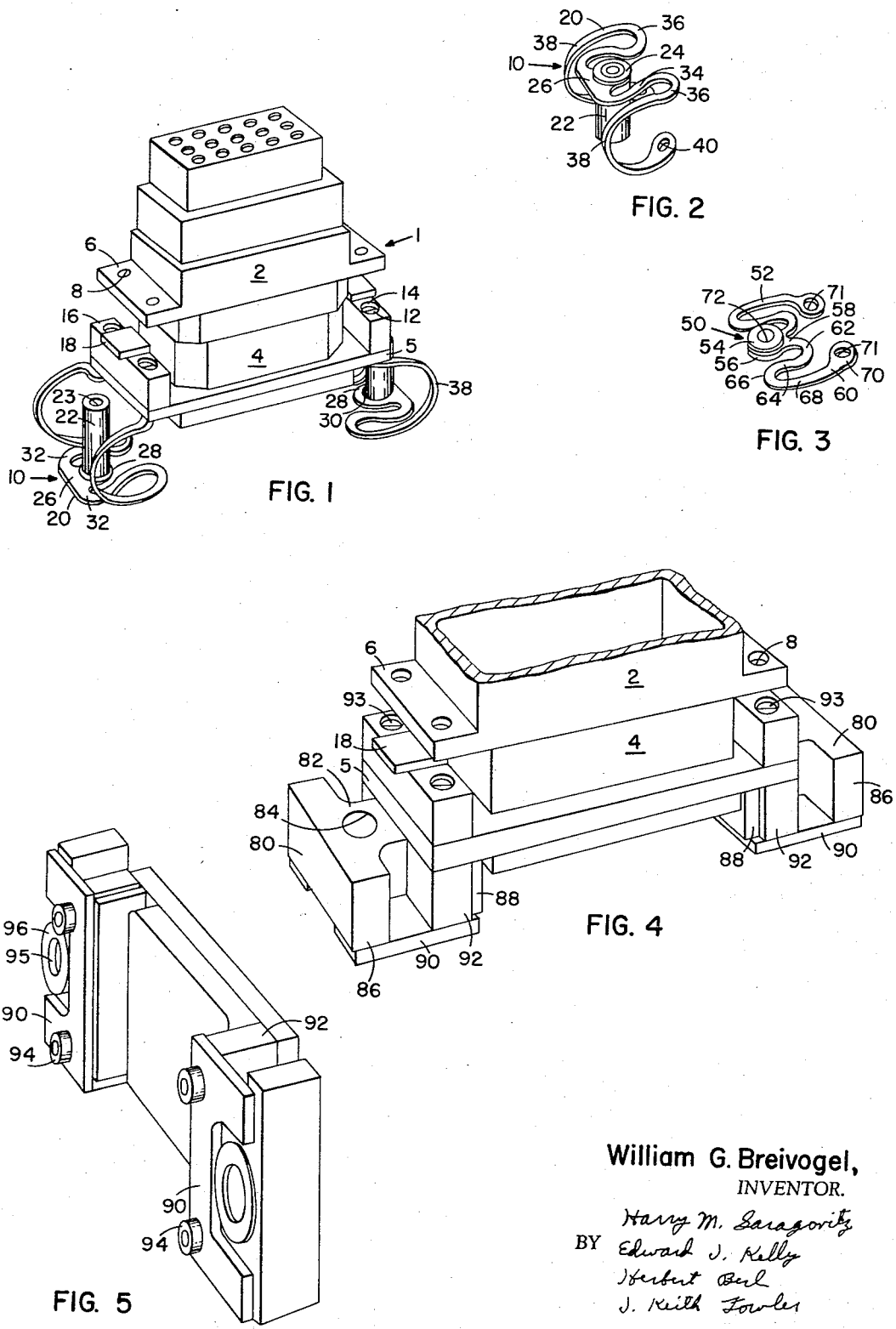

3,363,218
RESILIENT MOUNT FOR RACK AND PANEL
TYPE ELECTRICAL CONNECTORS
William G. Breivogel, Madison, N.J., assignor, by mesne assignments, to the United States of America as represented by the Secretary of the Army
Filed Aug. 31, 1965, Ser. No. 484,140
7 Claims. (Cl. 339—93)

ABSTRACT OF THE DISCLOSURE

A resilient mount for resiliently mounting one of the connector halves of an electrical connector assembly wherein the mount is secured between a support and said one connector half. The resilient mount includes a pair of resilient units, each unit having a central body portion carrying a float bushing and having a pair of resilient leg or arm portions.

---

This invention relates to a resilient mount for mounting a pair of telescopingly engageable electrical connector elements or halves. More particularly, the invention relates to an improved unitary resilient mount especially adapted for use with a rack and panel type electrical connector assembly to resiliently mount one of the mating connector elements.

In the standard rack and drawer assemblies of the ground equipment for missile control systems, radar systems, etc., rack and panel type electrical connector assemblies are commonly used. A connector assembly of this type generally includes a first, male, connector element or half and a second, female, connector element or half, said connector halves being capable of coaxial, mating engagement. Each of the connector halves is provided with a plurality of electrical contacts whereby a number of control circuits are made or broken respectively, by engagement or disengagement thereof. In such an assembly, it is common practice to resiliently mount one of the connector halves, normally the rack mounted connector half. Thus, in such an arrangement, the latter connector half is resiliently mounted for support on a stationary rack while the other connector half is rigidly secured to the exterior of the rearward or inner end wall of a slidably movable drawer. Accordingly, upon movement of the drawer in sliding engagement within the rack, the connector half carried thereby is matingly engaged in telescoping relationship with the resiliently mounted connector half on the rack to provide positive contact between a plurality of connector circuits carried thereby.

A primary requirement in the development of rack and panel connectors is that maximum engagement of the connector contacts must be assured regardless of the relative alignment of the drawers and racks of the equipment cabinets. Thus, the resiliently mounted connector half must absorb the axially applied impact on sliding movement of the drawer as well as compensate for any misalignment in X, Y and Z directions, for example, with respect to the axially applied impact.

Resilient mounts used heretofore have not proven entirely satisfactory, and the use thereof has resulted in unsatisfactory performance of the control circuits which are connected by the connector assembly. Such mounts have failed to function properly within the desired deflection range without deformation while allowing for slight misalignment of the two connector halves. Further, a large number of parts have been required for mounting heretofore known resilient mounts, thus, resulting in relatively high costs in both manufacture and maintenance.

It is therefore an object of this invention to provide an improved resilient mount for resiliently mounting a connector half which is subject to impact in a direction along its longitudinal axis and which is subject to misalignment in several other directions, e.g., in directions transverse to said axial direction.

Another object of the invention is to provide a unitary resilient mount having the feature wherein the resilient element is adapted to be deflected a predetermined amount without deformation thereof.

A still further object of the invention is to provide a unitary spring element for use in a resilient mount of the type described which is easily manufactured, economical, and which requires a minimum number of parts for assembly.

An important feature of the invention resides in the provision of a resilient mount which provides a floating type connection between the mount and the connector half which is resiliently mounted thereby.

A still further feature of this invention resides in the provision of a molded, unitary, neoprene block for use as a resilient element of a resilient mount for resiliently mounting a connector half.

These and other objects of the invention will become more fully apparent from reference to the following detailed description and accompanying drawing, in which:

FIGURE 1 is an elevational view of a typical rack and panel type electrical connector assembly having a resilient mount according to a preferred embodiment of the invention;

FIGURE 2 is an elevational view of one of the spring elements, per se, of the assembly of FIGURE 1, said element being shown in inverted position from that shown in FIGURE 1;

FIGURE 3 is an elevational view of another embodiment of a resilient mounting unit according to the invention;

FIGURE 4 is an elevational view of still another embodiment of the invention applied to a connector assembly;

FIGURE 5 is a view of the resilient mount assembly viewed in a direction upwardly from the bottom of FIGURE 4.

Referring now to the drawing, FIGURE 1, there is shown a rack and panel type electrical connector assembly 1 including a female connector element or half 2 and a male connector element or half 4 telescopingly received coaxially therewithin. A plurality of electrical contacts (not shown) are made by mating engagement of pin elements and socket terminals (not shown) carried, respectively, by elements 2 and 4. Connector half 2, normally rectangular in shape, is formed with a pair of protruding side flanges 6 which have apertures 8 formed therethrough for securement as by screws or bolts (not shown) to the inner end wall of an equipment cabinet drawer (not shown).

To provide means for resiliently mounting male connector half 4 to a stationary rack (not shown), for example, a resilient mount unit comprising a pair of resilient mounting elements 10 is provided. As shown in FIGURE 1, each of these mounting elements is secured as by screws 12 extending through apertures 14 in spacer member 16 in a manner to be more fully described hereinafter. Each of the spacer members is provided with a stop means 18 for limiting relative axial movement of parts 2 and 4 in one direction, i.e., in a contracting direction on telescoping engagement of the male and female connector halves.

It is apparent from the drawing (FIGURE 2), that each mounting element 10 includes a continuous, unitary spring 20 made from suitable flat spring material, e.g., soft grade "A" berryllium copper which is hardened to spring temper by heat treatment after the spring is formed, and a float bushing 22 carried thereby. The spring element is defined by a first, straight, body portion 26 disposed in a first plane common with its width. A ring-like mounting portion 28 is formed integral with the median portion of the side edge of portion 26 which is nearer the connector assembly when mounted (FIGURE 1). It is noted that the ring-like mounting portion extends from body portion 26 in the same plane therewith and is provided with a central aperture 30, the axis of which extends normal to said last-named plane. Float bushing 22 has a reduced diameter portion that is slightly smaller than the diameter of aperture 30 and is disposed with said aperture thereby providing means for mounting the spring element on a stationary rack (not shown), e.g., of an equipment cabinet (not shown). Bushing 22 is provided at one end with a head 24 for limiting relative movement of the spring element thereon. At each of the opposite ends of body portion 26, a bend 32 is formed in a manner so as to have the running end thereof extending alongside portion 28. A resilient support arm joins with said running end, and a portion 34 thereof extends toward the connector assembly and joins with a reverse bend 36. Extending from each of the reverse bends is a generally U-shaped or bail portion 38. Each of the bail portions is disposed in a plane normal to the first, straight, body portion and in spaced, parallel relationship with the common axis extending axially of the float bushing and axially of the connector assembly. The terminal or free end of each bail portion is inturned and provided with a mounting aperture 40 adapting the same for securement as by screws 12 to connector half 4.

Accordingly, to resiliently mount connector half 4, a pair of spring elements 10 are secured thereto as by bolts 12 extending through apertures 14 in spacers 16, corresponding apertures (not shown) in attachment flanges 5, and through apertures 40. Each spring element is secured at its opposite end by means, such as a bolt, (not shown) extending through float bushing bore 23 and secured to a stationary rack or other support (not shown).

In operation, upon telescoping engagement of the connector halves, i.e., coaxial movement in a contracting manner, a slight amount or degree of flexing will occur initially, and, consequently, on engagement of flanges 6 with stops 18, the greatest degree of flexing of the spring elements will occur. The relationship of the electrical contacts (not shown) carried by the respective connector halves with respect to the distance between flanges 6 and stops 18 is predetermined so as to assure maximum engagement of the connector contacts (not shown) ragardless of relative alignment of the drawers and racks. In this regard, it has been found to be desirable for the pin and socket contact elements (not shown) of the connector halves to be fully mated, in practicaly all cases, prior to further compression of the springs. Hence, the resilient mount described is effective to yield the desired resilience in an axial direction, i.e., in a direction axially of the assembly and the bushings, regardless of the alignment of the connector elements. Since the resilient mount will inherently allow flexing in several directions other than axially, misalignments will be compensated thereby. In addition, due to the loose fit between the bushing and ring-like portion 28, limited relative movement between the bushing and this portion will result. It is apparent that the resilient mount absorbs energy resulting from axially applied impact while further allowing for movements in X, Y and Z planes relative thereto.

A further embodiment of a resilient mount according to the invention is shown in FIGURE 3 wherein the resilient mount includes a pair of resilient elements 50 (only one being shown), each element including a generally flat spring 52 with a float bushing 54 mounting therein. Spring 52 is formed from a unitary length of thin, flat spring material and includes a centrally disposed mounting ring 56 joined at a peripheral portion 58 with the inner ends of a pair of resilient support arms 60. Each support arm is defined by a first reverse bend 62 at the inner end thereof, a first straight portion 64, a second reverse bend 66 and a second straight portion 68 extending parallel with said first straight portion. The terminal end 70 of each arm is turned inwardly and apertured at 71 for securement as by screws to mounting flange 5 and spacer 16 of the male connector half. It should be noted that the float bushing is received with slight clearance within the apertured mounting ring. As in the previously described embodiment, each of the resilient elements is secured to its support or rack (not shown) as by a bolt (not shown) extending through bore 72 of the float bushing. This embodiment of the invention operates in similar fashion to that of FIGURES 1 and 2, wherein the support arms of the resilient elements absorb shock resulting from axial impact of the mating connector halves while allowing for misalignment.

Another modification of the invention is shown in FIGURES 4 and 5. In this form of the invention, the resilient mount consists of a pair of substantially I-shaped, molded blocks 80 of neoprene or like material. Each of the blocks includes an elongated body portion 82 having a centrally disposed aperture 84 formed therein and a pair of support arms 86 and 88 extending across opposite ends thereof in normal relationship therewith. The neoprene block is secured to the male connector half by an assembly of parts including a U-shaped support plate 90, spacers 92, bolt 93 and nut 94. To mount the neoprene block for operation with the male connector half, the block is placed on suppot plate 90, spacers 92 are positioned on opposite sides of the body portion 82 and bolts 93 are passed through corresponding apertures (not shown) in the plate, spacer and protruding mounting flange 5 of the male connector half. To secure the resilient mount to a stationary support or rack (not shown) a bolt or the like securing means (not shown) is passed through bore 95 of bushing 96, the bushing being disposed with slight clearance within aperture 84 (FIGURE 4) so as to allow a slight degree of relative movement therebetween.

In operation, the latter embodiment operates in a similar manner to the other described embodiments. Thus, in this embodiment, the area of the resilient block immediately surrounding the float bushing is flexed.

In each embodiment of the invention, the design of spacer member 16, stops 18 and the spacing between the stops and flange 6 of element 4 may be predetermined in accordance with the desired degree or amount of engagement of the connector halves prior to further flexing of the respective resilient mounts.

Accordingly, is is apparent that a plurality of resilient mounts are provided, each of which is particularly adapted for use in resiliently mounting a connector half of a rack and panel type electrical connector assembly. Each of the mounts functions to effectively absorb impact energy as well as to compensate for slight misalignment of the telescoping connector halves. In addition, vibration is minimized during use thereby reducing the number of failures or malfunctions in the electrical circuits connected by the connector assembly. Thus, a plurality of highly effective resilient mounts is provided, said mounts being relatively simple, easily manufactured, economically produced, easily mounted and easily maintained.

I claim:

1. In a rack and panel type electrical connector assembly including a first connector half and a second connector half, said second connector half being formed at one end for telescoping engagement with said first connector half and having a pair of attachment flanges extending laterally from opposite sides of the other end thereof, said second connector half being adapted to be resiliently mounted for support by a resilient mount, said resilient mount comprising:

a pair of resilient units, each unit having a body portion and a pair of resilient arm portions extending therefrom; said body portion having a bore extending through the central portion thereof, each of said arm portions having an aperture formed therein so as to receive means for securement of said unit to said second connector half; and a float bushing disposed with clearance within said central bore in each said unit, said bushing having an axial bore extending therethrough so as to receive means for securement to a support.

2. A resilient mount as set forth in claim 1, wherein each said resilient unit is a unitary spring made of flat spring material and the resilient arms are defined by flexible bail portions of said spring.

3. A resilient mount adapted for use in resiliently mounting one of the connector halves of a connector assembly including a pair of telescoping connector halves, said resilient mount including a pair of resilient mounting units, each unit comprising:

a spring formed of a continuous length of flat spring material and defined by a body portion and a pair of spaced-apart, resilient support arms extending from said body portion, said body portion having a central aperture formed therein and each of said arms having a second aperture formed in the terminal, free end thereof adapting the spring for securement to said one connector half; and a float bushing disposed with clearance within said central aperture, said bushing having an axial bore adapted for receiving securement means for affixing the spring to a support.

4. A resilient mount as set forth in claim 3 wherein each of said support arms is defined by a bail portion disposed on opposite sides of said bushing.

5. A resilient mount as set forth in claim 3 wherein each said support arm is defined by a substantially U-shaped portion disposed in a plane common with its width and in the same plane as said body portion.

6. In a rack and panel type electrical connector assembly including a male and a female connector element, said elements having juxtaposed ends adapted for telescoping engagement upon relative coaxial movement thereof, a pair of unitary resilient mounts adapted to be interposed between the opposite end of said male element and a stationary support for resiliently mounting the male element, each said resilient mount comprising:

a flat spring defined by a body portion, said body portion having an integrally formed mounting ring disposed in the same plane with said body portion and extending from the midportion of one side thereof, a pair of resilient support arms extending from opposite ends of said body portion in the same direction as said mounting ring, each of said arms having a return bent portion terminating with one end of a bail portion, a mounting aperture provided in the opposite end of each said bail portion whereby the spring may be secured to said male connector element; and an elongated float bushing received with slight clearance within said mounting ring, said bushing being disposed intermediate the bail portions of the spring, said float bushing having a central bore formed therein whereby said male connector element may be secured to a stationary support.

7. A spring mount formed of a continuous length of flat spring material and adapted for securement between a member adapted for movement relative to its support, said spring mount comprising:

a body portion disposed in a plane common with the width thereof and having a first mounting means formed integral therewith, said first mounting means having a central bore extending therethrough;

a pair of generally U-shaped legs integral with said body portion, each leg being disposed in a second plane normal to said first plane but spaced from said first mounting means on opposite sides thereof, each of said legs being joined at one end with said body portion and having the opposite, free end thereof formed with second mounting means adapting the same for securement to said member; and an elongated float bushing received with clearance within the bore in said first mounting means, said bushing having a central bore formed therein for receiving securement means whereby said member may be secured to said support.

References Cited

UNITED STATES PATENTS

| | | | |
|---|---|---|---|
| 1,533,210 | 4/1925 | Radu | 339—93 |
| 1,616,176 | 2/1927 | Bremer | 339—93 |
| 1,763,796 | 6/1930 | MacDonald | 339—93 |
| 1,815,170 | 7/1931 | Summers | 248—21 |

MARVIN A. CHAMPION, *Primary Examiner.*

J. H. McGLYNN, *Assistant Examiner.*